United States Patent [19]

Staudinger

[11] 4,445,278

[45] May 1, 1984

[54] WHEEL ALIGNMENT MEASURING APPARATUS, MORE SPECIALLY FOR DYNAMIC OPERATION

[75] Inventor: Alfons Staudinger, Munich, Fed. Rep. of Germany

[73] Assignee: A. Rohe GmbH, Nordring, Fed. Rep. of Germany

[21] Appl. No.: 394,310

[22] Filed: Jul. 1, 1982

[30] Foreign Application Priority Data

Jul. 2, 1981 [DE] Fed. Rep. of Germany ....... 3126152

[51] Int. Cl.³ ............................................. G01B 5/255
[52] U.S. Cl. ............................... 33/203.12; 33/203.14
[58] Field of Search ................ 33/203.12, 203.14, 203, 33/203.18, 203.19

[56] References Cited

U.S. PATENT DOCUMENTS

| | | | |
|---|---|---|---|
| 2,020,614 | 11/1935 | Miller | 33/203.12 |
| 2,133,827 | 10/1938 | Miller | 33/203.12 |
| 2,266,224 | 12/1941 | MacMillan | 33/203.12 |
| 2,758,385 | 8/1956 | Martin | 33/203.12 |
| 3,181,248 | 5/1965 | Manlove | 33/203.12 |

*Primary Examiner*—Willis Little
*Attorney, Agent, or Firm*—Gregory J. Nelson

[57] ABSTRACT

In a wheel alignment measuring apparatus, more specially designed for dynamic operation, there is at least one wheel channel which is able to be turned in relation to a base plate and able to be moved parallel to itself and normal to the direction the vehicle is heading. Readings taken are processed electronically and displayed.

16 Claims, 8 Drawing Figures

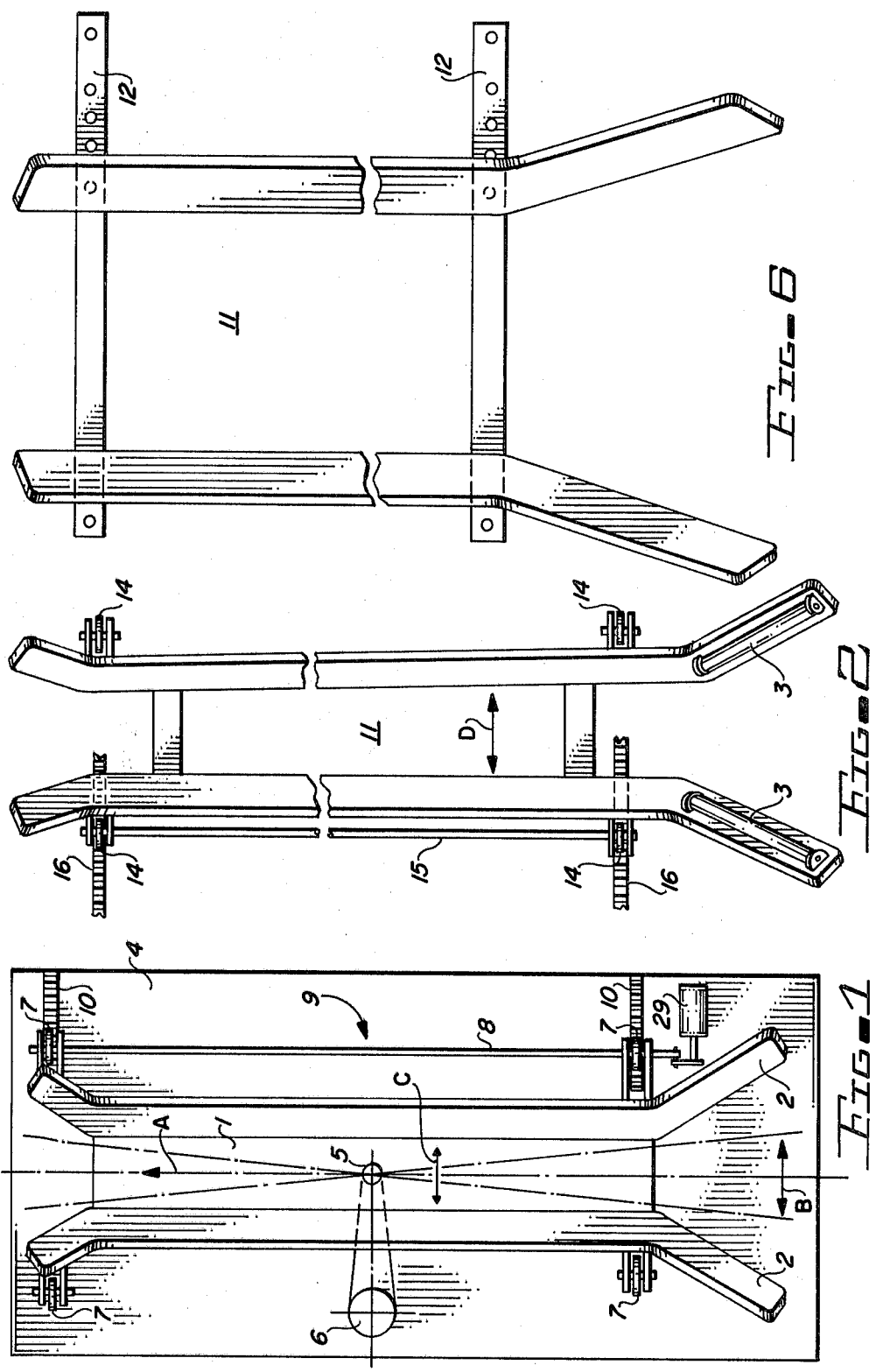

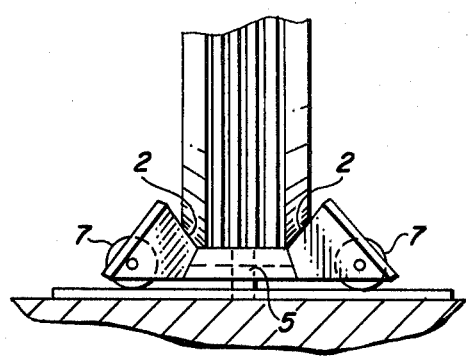
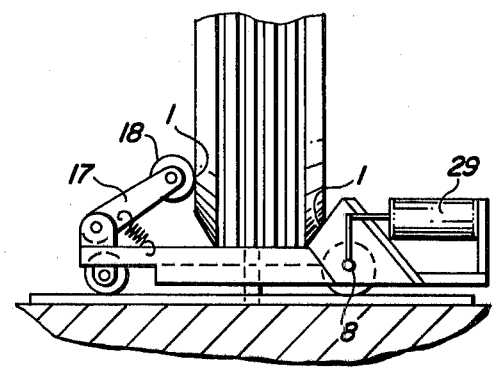
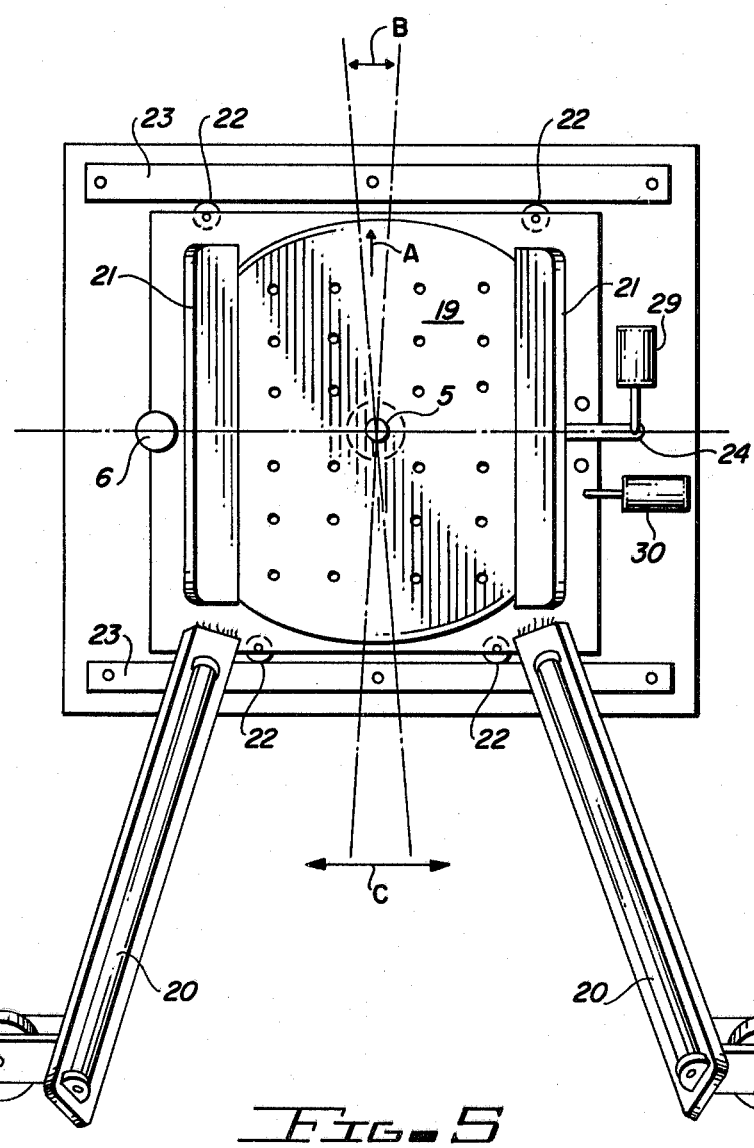

WHEEL ALIGNMENT MEASURING APPARATUS, MORE SPECIALLY FOR DYNAMIC OPERATION

FIELD OF THE INVENTION

The present invention is with respect to a motorvehicle wheel alignment measuring apparatus and more specially to such an apparatus which may be used for dynamically measuring wheel alignment.

Testing the wheel alignment of motorvehicles is something presently being undertaken to an ever increasing scale at regular inspection and upkeep operations because it is a way of greatly decreasing wear of parts, more specially tire wear, so that the working life of such parts may be increased. To undertake such wheel alignment testing as part of inspection in a workshop, it is necessary that the measuring operation be undertaken quickly and simply. At the same time, the measuring apparatus needed for this purpose has to be such as to put up with rough use, that is to say be designed to take into account likely working conditions in a garage.

GENERAL OUTLINE OF THE INVENTION

One purpose of the invention is that of designing a measuring apparatus for testing the wheel alignment of motorvehicles which is simple in structure and may be readily used.

A further purpose of the invention is that of designing such an apparatus which is sturdy in structure.

A still further purpose of the invention is that of designing a measuring apparatus which gives exact readings.

For effecting such purposes, and further purposes, a measuring apparatus for the wheel alignment of motorvehicles, and which is more specially designed for dynamic operation, may be designed so that it has a wheel channel for the wheel whose alignment is to be tested, such channel being designed fo resting against side walls of a tire on such a wheel and being turningly supported so that it may be turned in a horizontal plane. Furthermore, the channel is open at its two ends so that a wheel may be rolled into and out of it at such ends on moving the vehicle. Further details of the invention will be seen in the claims.

In the preferred embodiment of the invention there is provided at least one wheel channel, through which a vehicle wheel may be rolled as the vehicle is moved, which is supported so that it may be turned about an upright axis, and an angle transducer takes a reading for such turning, the reading or signal then being processed by an electronic system. In this respect the wheel channel has, more specially, a turnpin so that it may be readily turned through an angle of some degrees in relation to the direction in which the vehicle is pointing and so that the wheel channel goes into a position representative of the angle of the vehicle wheels to each other on one axle of the vehicle. Furthermore, the wheel channel is also guided so that it may be moved for adjustment (while keeping parallel to itself) normal to the direction in which the vehicle is pointing. As a further useful development of the invention, a further wheel channel, which may be fixed in position or may be able to be moved in a direction normal to the direction of the vehicle, is present for use with the first-noted wheel channel. Using two such channels, it is possible for the track width difference of the front wheels of a vehicle to be measured to be balanced. Using two moving wheel channels, the camber angle of the wheels may be measured if the two channels, at least on one side, are moved and guided by a sensing part able to be moved in an upright plane. It is best for the wheel channels to have a length equal to about half the wheel circumference or more so that a measuring operation may be undertaken dynamically, that is to say driving the motorvehicle through the apparatus so that at the starting and end positions, the direction in which the wheel is pointing is measured and an average value displayed. This furthermore has the effect of balancing out any wheel wobble, this producing very exact readings. A pulsator joined with the wheel channel may be used for testing for, and measuring play in moving parts of the front vehicle axle, that is to say the wheel suspension, the steering gear joints and wheel bearing. In this case the pulsator will take effect in the direction of turning and also in the direction of translation of the wheel channel, as noted, parallel to itself.

LIST OF FIGURES AND DETAILED ACCOUNT OF WORKING EXAMPLES OF THE INVENTION

An account will now be given of working examples of the invention using the figures.

FIG. 1 is a plan view of a wheel channel forming part of the measuring apparatus of the invention.

FIG. 2 is a plan view of a further wheel channel for use with the wheel channel to be seen in FIG. 1.

FIG. 3 is a front, end-on view of the wheel channel to be seen in FIG. 1.

FIG. 4 is a front, end-on view of a further form of a wheel channel.

FIG. 5 is a plan view of a working example of the measuring apparatus.

FIG. 6 is a plan view of a wheel channel to be used with the wheel channel to be seen in FIG. 5.

Figure 7:
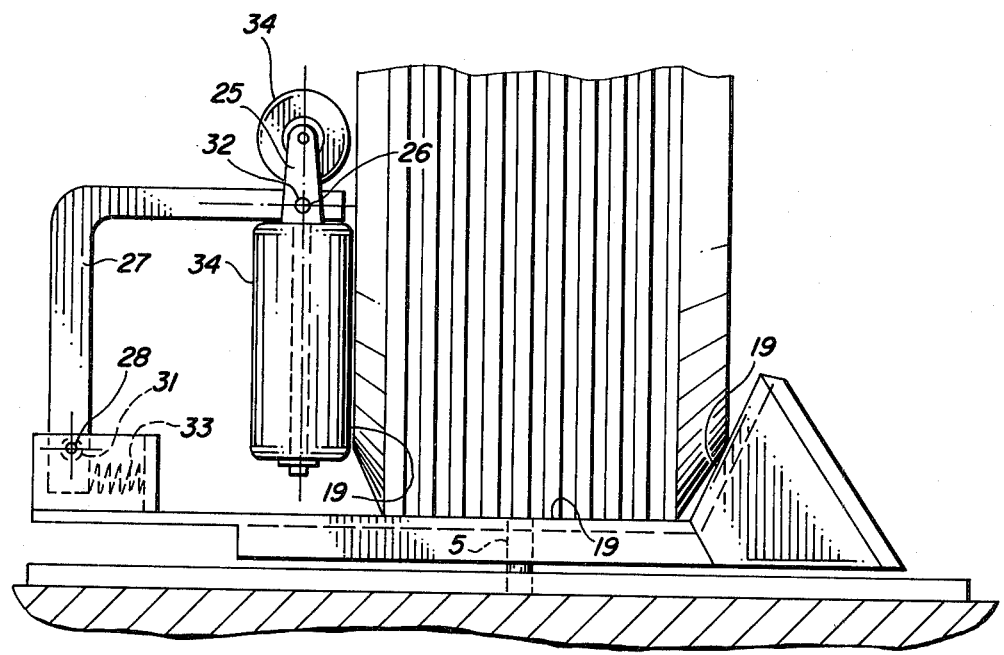
FIG. 7 is a front, end-on view of a further working example of the invention.

The measuring apparatus to be seen in the figures is used for testing the alignment of wheels, more specially automotive wheels. In FIG. 1 a wheel channel 1 will be seen made up of two long parallel wheel rails 2, which are outwardly angled at their ends and furthermore have a face which is at a slope to the horizontal, see more specially figure 3. The outwardly angled end parts are for making driving the wheel onto and down from the channel 1 simpler and are best designed with rollers 3, forms of such rollers being seen for example in FIGS. 2 and 5. The direction of motion in the wheel channel 1 is arrowed A.

The wheel channel 1 is on a base plate 4, on which it may be turned, such turning motion being best made possible by having a turnpin 5, fixed in the middle of, and under the channel 1 so that the channel may be moved in relation to base plate 4 to one side or the other as marked by arrow B, such turning motion of the wheel channel in relation to the base plate only having to be through some degrees of angle. Turnpin 5 is joined up with an angle-sensing transducer, only to be seen diagrammatically in FIG. 1, so that readings are produced for changes in angle (to the side).

In addition to its being possible for channel 1 to be turned, the design is furthermore best such that it may be moved in translation in relation to base plate 4, that is to say in the direction arrowed C and normal to the direction A of driving or rolling the wheel through the channel. When such translation motion takes place, wheel channel 1 is kept parallel to itself, that is to say parallel to the direction A. This is made possible because channel 1 is supported by a number of wheels 7, whose axes of turning are parallel to the length-direction of wheel channel 1. In the working example of FIG. 1 there are, in all, four wheels, of which at least two are joined together by a torsion rod 8, running along the common axis 9 of turning of the two wheels, the torsion rod being so designed that at the common axis 9 of turning there is so much torsional stiffness (and no more) as to make certain that the channel 1 may be moved parallel to itself and to rolling direction A when only one of its ends is pushed.

As will further be seen from FIG. 1, it is furthermore possible for the wheel channel to be kept parallel to itself while being moved in translation by having rack-like guides 10 on the base plate 4 for use with support wheels 7. Translation motion of channel 1 in the direction of arrow C may be measured by displacement measuring instrument which is not marked in the figure to make the same simpler.

It will be seen from this that channel 1 of FIG. 1 may be moved into the tracking position of the automotive wheels, channel 1 being able to be moved parallel to itself in the direction of arrow B while, because of the presence of turnpin 5 (and rod 8 for turning of wheels 7) it may be "steered" in the direction of arrow B.

For taking readings for wheel alignment, it is possible to have two such wheel channels 1 for the two front wheels. For this reason, the toe-in or toe-out of the two wheels may be measured separately. However, in a useful form of the invention to be seen in FIGS. 2 and 6, a further channel 11, used with wheel channel 1, is not able to be turned. Channel 11 used with channel 1 (see FIG. 1) may be used for example for taking up and guiding the offside motorvehicle wheel on driving into the channel with zero toe-in, with the driver keeping his hands off the steering wheel. Because channel 1 may be moved in the direction of arrows B and C, differences in track size may be taken up.

Wheel channel 11, to be seen in FIG. 6, is generally fixed in position, but for the fact that its inner breadth may be changed using rails 12 with holes.

The apparatus may furthermore, however, be used for measuring the camber angle, if the wheel channels are able to be toed and the two are guided, at least on one side, using a feeler crosspiece 25, able to be moved in an upright plane, as may be seen in FIG. 7. The function of the feeler crosspiece 25 will be gone into in further detail later. The wheel channel 11 of FIG. 2 is so designed that it may be moved in the direction of arrow D, parallel to direction of arrow C. On the same lines as in FIG. 1, wheel channel 11 has support wheels 14 so that it may be moved in translation. At least two support wheels 14 have a common axis 15, the wheels meshing in rack-like guides 16. For torsionally stiffly joining together two such wheels 14, there is a shaft (torsion rod) stretching along the common axis 16 of turning. The guiding effect so produced for the wheel channel 11 makes certain, on the same lines as was the case with wheel channel 1, that channel 11 is moved in the arrowed direction D so as to be parallel to itself and to the direction A of wheel rolling along the channel.

A further form of breadth adjustment of wheel channel 1 is lastly to be seen in FIG. 4, in which case the nearside wheel rail is in the form of a spring-loaded rocker 17 having a roller 18 so that channel 1 may be simply matched to the tire breadth.

In the working examples noted herein, the wheel channel 1 has a length equal to about half a wheel circumference to a full circumference, this making possible dynamic measuring as the motorvehicle is moved along the channel and through the apparatus. The readings are naturally taken and processed electronically, measuring being undertaken dynamically on moving the wheels on the channels in such a way that readings are taken at the start and end positions, in the direction of motion of the wheel, and the average value is presented. Measuring in this way makes an allowance for wheel wobble.

In the working example of FIG. 5 readings are taken for the toe angle of the vehicle in one position, the left hand wheel channel 19 of FIG. 5 being again used with the right hand wheel channel 11, for example on the lines to be seen in FIG. 6. The working example of FIG. 5 has two guide-in rails with rollers 20. The wheel channel 19 as such is formed by two rails 21. By way of a turnpin 5, channel 19 may be turned on a base plate. Turnpin 5 is again joined with an angle transducer 6 and the channel 19 may be turned in the direction of arrow B. Furthermore, channel 19 may be moved in translation because it has support wheels 22, rolling along rails 23, supported on the base plate, running in direction C.

As will furthermore be seen from FIG. 5, the apparatus has pulsators 29, 30 so that wheel alignment may be tested with the wheels acted upon by such pulsators to see if there is backlash in the suspension, in the joints of the steering system and in the wheel bearings. In this respect, pulsator 29 is lined up with turnpin 5, it producing by way of a link 24 a rocking force acting on the wheel channel. Pulsator 30 takes effect in the direction of arrow C. Pulsators 29 and 30 are best in the form of double-acting cylinders.

The example of the invention of FIG. 1 as well has a pulsator 29 designed for acting on torsion rod 8 so that pulsator 29 takes effect in the direction C of translation motion and furthermore in the direction B of turning motion.

FIG. 7 is a view of a generally T-like sensing crosspiece 25, which is guided for motion in a vertical plane. The two ends of crosspiece 25 each have a sensing wheel 34. The crosspiece, which is furthermore responsible for a guiding function within the channel 19, is fixed to a leg 27, supporting it for turning motion about a generally horizontally running axis 26. Leg 27 is, for its part, able to be moved along and turned about the axis of a turning rod 28 which is joined with an angle transducer 31 for producing readings with respect to changes in angle of leg 27. The turnpin at axis 26 is furthermore joined up with an angle transducer 32 which is only marked diagrammatically in the figure. Leg 27 is acted upon by a spring 33 for pushing it against the wheel of the vehicle. In the present working example, spring 33 is in the form of a compression spring. The angle transducers are joined up with the electronic system of the measuring apparatus. Motion at rod 28 towards the wheel gives a plus value reading while backward motion in the vertical plane at axis 26 gives a minus value reading or signal so that equal changes in angle have a balancing effect and it is only the further motion at the axis 26 in relation to turning rod 28 which gives a reading which is in fact displayed on the console.

In order to take readings with the apparatus of FIG. 7, allowing for wheel wobble, it is necessary for the wheels to be turned on rollers or for two readings to be taken on driving the wheels through the channels. For a simple inspection, such an operation is, however, mostly overcomplex so that this form of the invention has not been taken into account in the figures.

Figure 8:
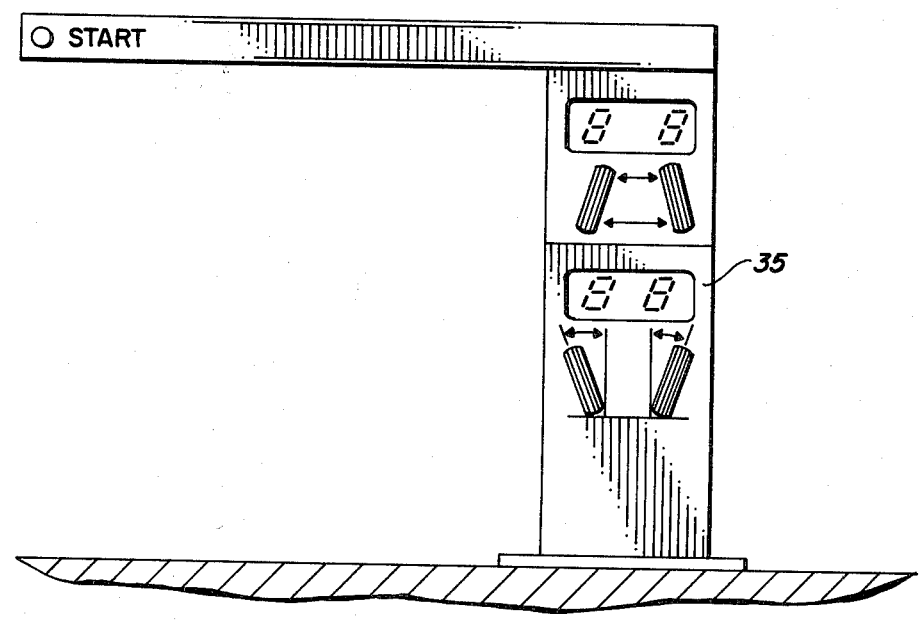
FIG. 8 is a view of a control console housing an automatic system.

The electronic system is housed in the console 35 with switches and displays, see FIG. 8, the console furthermore having an arm with the start pushbutton placed thereon. A measuring operation takes place automatically, the user of the apparatus only having to make use of the start pushbutton, after which he may keep his seat in the vehicle. The electronic system takes in the measurements of the angle transducers 6, 31, and 32, processes such measurements as known in the art and produces the readings for toe-in and camber angle which values are then presented on console 35 to the user.

While it will be apparent that the invention herein disclosed is well calculated to achieve the benefits and advantages as hereinabove set forth, it will be appreciated that the invention is susceptible to modification, variation and change without departing from the spirit thereof.

I claim:

1. A wheel alignment measuring apparatus for dynamically measuring the track of vehicle wheels comprising:
   (a) a first wheel channel having two open ends so that a vehicle wheel may be rolled therethrough;
   (b) a second wheel channel being spaced from said first wheel channel at a distance corresponding to the track of the vehicle for taking up two wheels on an axle of the vehicle whose wheel alignment is to be tested;
   (c) the first and second wheel channel having a length equal to at least between half and the full circumference of a wheel to be tested and being designed to engage the side faces of a tire on said wheels, wherein;
   (d) one of said channels being supported on bearings so that it may be turned in a horizontal plane and cooperable with an angle transducer operably connected to the channel for sensing the angle in which the channel is oriented with respect to a reference line and wherein;
   (e) at least one of said wheel channels being guided for motion parallel to itself and in a direction normal to the direction of rolling motion of a wheel along said channel by means of four support wheels having axes of turning parallel to said direction of wheel rolling, at least two of said support wheels having a common bearing shaft which shaft has the lowest degree of torsional stiffness necessary to keep motion of said channel parallel to itself when said channel is acted upon by a force at one end thereof.

2. A wheel alignment measuring apparatus as claimed in claim 1 having a turnpin, fixed to said first channel and giving a bearing function for turning of said first channel, said angle transducer being joined with said turnpin.

3. A measuring apparatus as claimed in claim 2, having a pulsator for acting on the turnpin in the direction normal to the run of said channel.

4. A measuring apparatus as claimed in claim 2, having a pulsator for acting on the wheel channel in the direction normal to the run of said channel.

5. A measuring apparatus as claimed in claim 3 or claim 4, wherein said pulsator has a double-acting cylinder.

6. A measuring apparatus as claimed in claim 1 or claim 2, having a sensing crosspiece forming one side of said wheel channel.

7. A measuring apparatus as claimed in claim 6, having angle transducers for sensing the angular position of said sensing crosspiece horizontally and vertically.

8. A measuring apparatus as claimed in claim 7, having an electronic system for taking the values as measured by the angle transducer(s) and processing such values for obtaining the readings to be displayed.

9. A measuring apparatus as claimed in claim 1 or claim 2, having a sensing crosspiece forming one side of said wheel channel and a leg on which said sensing crosspiece is turningly supported, said crosspiece being able to be moved along a horizontal axis of turning.

10. A measuring apparatus as claimed in claim 9 wherein said leg is turningly supported and springingly acted upon for motion towards a vehicle wheel to be tested.

11. A measuring apparatus as claimed in claim 1, in which said bearing shaft is in the form of a torsion rod.

12. A measuring apparatus as claimed in claim 11, having a rack-like guide to which said support wheels are geared.

13. A measuring apparatus as claimed in claim 1, having support wheels and rails for guiding motion of said channel in a direction normal to the direction of said channel.

14. A measuring apparatus as claimed in claim 1, claim 2 or claim 5, having a wheel on said channel and a turning leg supporting said wheel, said leg being able to be turned into a position matching the breadth of a tire on said vehicle wheel.

15. A measuring apparatus as claimed in claim 1, wherein the other of said wheel channels has support wheels, at least two of such support wheels ahving a common bearing shaft and a rack-like guide therefor for torsionally stiffly taking up such support wheels.

16. A measuring apparatus as claimed in claim 15 having a system for adjustment of the breadth of said second wheel channel.

* * * * *